United States Patent
Mast et al.

(10) Patent No.: US 11,177,576 B2
(45) Date of Patent: Nov. 16, 2021

(54) ANTENNA HAVING DEPLOYABLE ANTENNA FINS AND ASSOCIATED METHODS

(71) Applicant: EAGLE TECHNOLOGY, LLC, Melbourne, FL (US)

(72) Inventors: Alan W. Mast, Melbourne Beach, FL (US); Brinnan C. Riley, West Melbourne, FL (US); Charles F. Dull, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 258 days.

(21) Appl. No.: 16/452,630

(22) Filed: Jun. 26, 2019

(65) Prior Publication Data

US 2020/0411998 A1     Dec. 31, 2020

(51) Int. Cl.
| | |
|---|---|
| *H01Q 15/20* | (2006.01) |
| *H01Q 9/30* | (2006.01) |
| *H01Q 11/10* | (2006.01) |
| *H01Q 15/16* | (2006.01) |
| *H01Q 21/24* | (2006.01) |

(52) U.S. Cl.
CPC ............ *H01Q 9/30* (2013.01); *H01Q 11/105* (2013.01); *H01Q 15/161* (2013.01); *H01Q 21/24* (2013.01)

(58) Field of Classification Search
CPC ...... H01Q 9/30; H01Q 11/105; H01Q 15/161; H01Q 21/24; H01Q 5/25; H01Q 1/08; H01Q 21/20; H01Q 1/288; H01Q 21/02; B64G 1/10; B64G 1/66; B64G 1/222
See application file for complete search history.

(56) References Cited

U.S. PATENT DOCUMENTS

| | | | |
|---|---|---|---|
| 3,286,268 A | 11/1966 | Barbano | |
| 4,262,293 A | 4/1981 | Parmer | |
| 4,286,271 A | 8/1981 | Barbano et al. | |
| 4,296,416 A * | 10/1981 | Harader | H01Q 11/105 |
| | | | 343/792.5 |
| 4,315,265 A | 2/1982 | Palmer et al. | |
| 4,763,131 A | 8/1988 | Rosser et al. | |
| 5,635,946 A | 6/1997 | Francis | |
| 5,642,122 A | 6/1997 | Lockie et al. | |
| 7,126,553 B1 | 10/2006 | Fink et al. | |

(Continued)

FOREIGN PATENT DOCUMENTS

| | | |
|---|---|---|
| EP | 3270462 | 1/2018 |
| FR | 2983646 | 6/2013 |

OTHER PUBLICATIONS

Constantine et al., "UHF Deployable Antenna Structures for CubeSats," 2014 United States National Committee of URSI National Radio Science Meeting (USNC-URSI NRSM), Conference Jan. 8-11, 2014, IEEE, Oct. 20, 2018, pp. 1-2.

(Continued)

*Primary Examiner* — Dieu Hien T Duong
(74) *Attorney, Agent, or Firm* — Allen, Dyer, Doppelt + Gilchrist, P.A.

(57) ABSTRACT

An outer space deployable antenna may include a support shaft, a plurality of antenna fins, and an actuator. At least one draw cord may be coupled between the antenna fins and the actuator so that the antenna fins are moveable from a flat stored configuration to a fanned-out deployed configuration surrounding the support shaft.

25 Claims, 8 Drawing Sheets

(56) References Cited

U.S. PATENT DOCUMENTS

| | | | |
|---|---|---|---|
| 8,836,593 B2 | 9/2014 | Crowley et al. | |
| 9,555,904 B2 | 1/2017 | Abrams et al. | |
| 2007/0145195 A1 | 6/2007 | Thomson et al. | |
| 2018/0331433 A1* | 11/2018 | Geely | H01Q 11/10 |
| 2020/0203798 A1* | 6/2020 | Freebury | H01Q 1/288 |

OTHER PUBLICATIONS

Olson et al., "Structural Architectures for a Deployable Wideband UHF Antenna," 53rd AIAA/ASME/ASCE/AHS/ASC Structures, Structural Dynamics and Materials Conference Apr. 23-26, 2012, American Institute of Aeronautics and Astronautics, Jun. 14, 2012, pp. 1-10.

Constantine et al., "UHF Deployable Helical Antennas for CubeSats," IEEE Transactions on Antennas and Propagation, vol. 64, Issue: 9, Sep. 2016, pp. 3752-3759.

* cited by examiner

ANTENNA HAVING DEPLOYABLE ANTENNA FINS AND ASSOCIATED METHODS

FIELD OF THE INVENTION

The present invention relates to the field of antennas, and more particularly, to outer space deployable antennas and related methods.

BACKGROUND OF THE INVENTION

Small satellites have limited space to store electronics and an antenna, which becomes technically challenging when the electronics and antenna are designed to operate at the lower L-band and S-band frequencies. High performance antenna operating at those frequencies usually require significant volume. Even antennas designed to operate at the higher frequencies up to 20 GHz, or above, have size constraints that make them difficult to implement into small satellites, even though the antenna at those upper frequencies are typically reduced in size. This problem becomes challenging when small satellites are built as CubeSat platforms, which are miniaturized satellites made up of multiple block units known as CubeSats, each block unit being about 4 by 4 by 4 inches. CubeSats are advantageous for smaller satellites because they are designed to use commercial off-the-shelf (COTS) components for their major circuits and can be easily implemented for custom satellite operation.

In most practical small satellite applications, a number of CubeSat units are combined together to form a CubeSat platform as a small satellite that is typically intended for Low Earth Orbit (LEO) and perform scientific research and explore new space technologies. CubeSats are advantageous because their use as block units to build small satellites shortens the satellite development cycle, permits greater diversity in satellite design since each small satellite can be designed for a specific function, and reduces the overall cost of satellite deployment. CubeSats and even larger classes of small satellites often are suitable for launch with multiple small satellites per payload, thus using the excess capacity of larger launch vehicles and reducing the risk to the rest of the launch vehicle and other payloads.

Typical CubeSat satellite platforms are formed from multiple, individual CubeSat block units combined together and include a 6U design of about 4×8×12 inches or a 12U design of about 8×8×12 inches. Additionally, the small satellite class also envelopes larger form factors, such as EELV Secondary Payload Adapter (ESPA) each forming a satellite in the 100 to about 300 kg class. Small satellites can be propelled by cold gas, chemical promotion, electric propulsion, or solar sails. Most CubeSats and similar small satellites have internal batteries for power, which preferably include solar cells.

Many Low Earth Orbit (LEO) small satellites require an antenna for communicating in the L-band and S-band, and also X-band and Ka-band can be used for higher data rate communications. These higher frequency bands allow the use of smaller antennae due to the higher frequencies, but the constraints of small satellites, such as CubeSats, still make it difficult to implement workable antennas, even at the higher frequencies. These small satellites have limited volume and designing an antenna that can be compactly stored and deployed once orbit is reached is a challenge.

For example, horn and sinuous antennas are often used on small satellites, but take up a relatively large volume, especially at the lower L-band and S-band frequencies. Wideband antennas and communication modems offer the valuable potential to communicate with various ground stations or even perhaps other satellites directly. A log periodic parasitic monopole antenna (LPPMA) operates as a high performance antenna and may be used for many satellite communication applications because of its wideband performance, multi-polarization, excellent directivity, and other features. A technical drawback of this antenna, however, is it takes up a large volume, making that type of antenna difficult to implement in small satellites. For example, a log periodic parasitic monopole antenna may have a wide 10:1 bandwidth and operate up to 20 GHz and provide six arms for multi-polarization in both transmit and receive applications, making it useful for a variety of CubeSat and other Small Satellite applications. Those positive operating benefits, however, may make it difficult to implement that antenna onto small satellites since the antenna requires a relatively large volume compared to the size of the satellite. As a result, deployment of most antennas, including a log periodic parasitic monopole antenna, is difficult on small satellites.

SUMMARY OF THE INVENTION

In general, an outer space deployable antenna may include a support shaft, a plurality of antenna fins, and an actuator. At least one draw cord is coupled between the plurality of antenna fins and the actuator so that the plurality of antenna fins are moveable from a flat stored configuration to a fanned-out deployed configuration surrounding the support shaft.

The plurality of antenna fins may be in spaced relation about the support shaft in the fanned-out deployed configuration. A respective fin support may be coupled to a radially inner edge of each antenna fin to maintain the plurality of antenna fins in spaced relation. An electrical conductive layer may be between adjacent antenna fins.

In some embodiments, one of the plurality of antenna fins may be fixed to the support shaft. The support shaft may have a passageway therethrough and the draw cord extends through the passageway. The actuator may comprise an electric motor. Each fin may comprise a rigid dielectric layer and a conductive layer thereon. Each fin may have a tapered shape.

In yet another embodiment, a satellite may include a satellite housing and a satellite transceiver carried by the satellite housing. An outer space deployable antenna may be carried by the satellite housing and coupled to the satellite transceiver. The outer space deployable antenna may comprise a support shaft, a plurality of antenna fins, and an actuator. At least one draw cord may be coupled between the plurality of antenna fins and the actuator so that the plurality of antenna fins are moveable from a flat stored configuration to a fanned-out deployed configuration surrounding the support shaft.

Another aspect is directed to a method for making an outer space deployable antenna. The method may comprise assembling a support shaft and a plurality of antenna fins adjacent the support shaft. The method may include coupling at least one draw cord between the plurality of antenna fins and an actuator so that the plurality of antenna fins are moveable from a flat stored configuration to a fanned-out deployed configuration surrounding the support shaft.

DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1A:
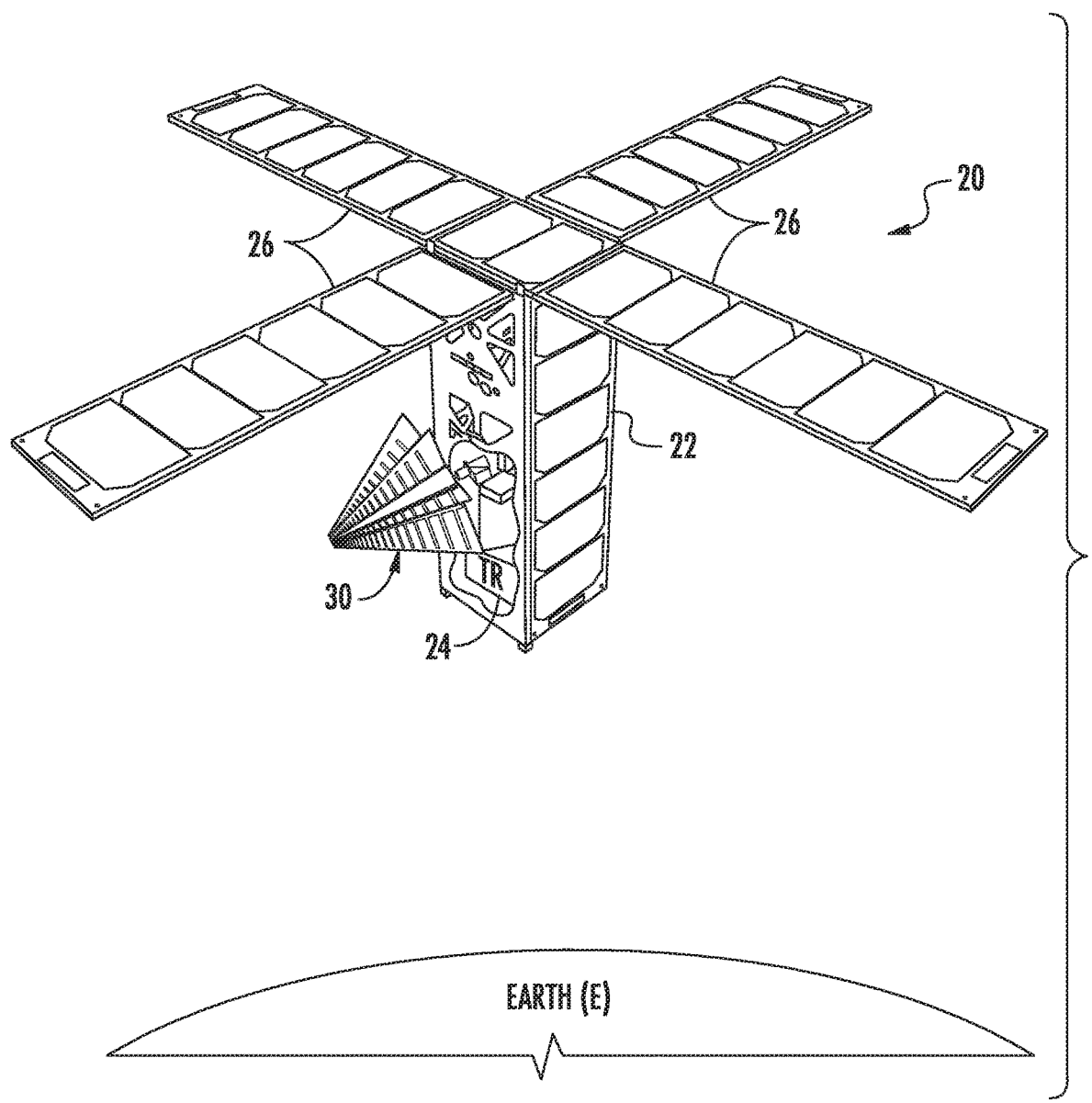
FIG. 1A is a perspective view of a satellite carrying the outer space deployable antenna in its fanned-out deployed configuration.

Referring initially to FIG. 1A, a satellite is illustrated generally at 20 and shown orbiting Earth (E) in a Low Earth Orbit (LEO) as typical for small satellites, although any orbit altitude may be established depending on satellite functions. The satellite 20 includes a satellite housing 22 shown partially cut away and a satellite transceiver 24 carried by the satellite housing 22 and solar panels 26. The satellite 20 is a small form factor satellite, which could be formed by one or more CubeSats, but not limited to this implementation. The satellite transceiver 24 and any associated electronic components and circuits may be formed from Conventional Off-The-Shelf (OTS) components as is typical for those smaller satellites formed from CubeSats.

Figure 1B:
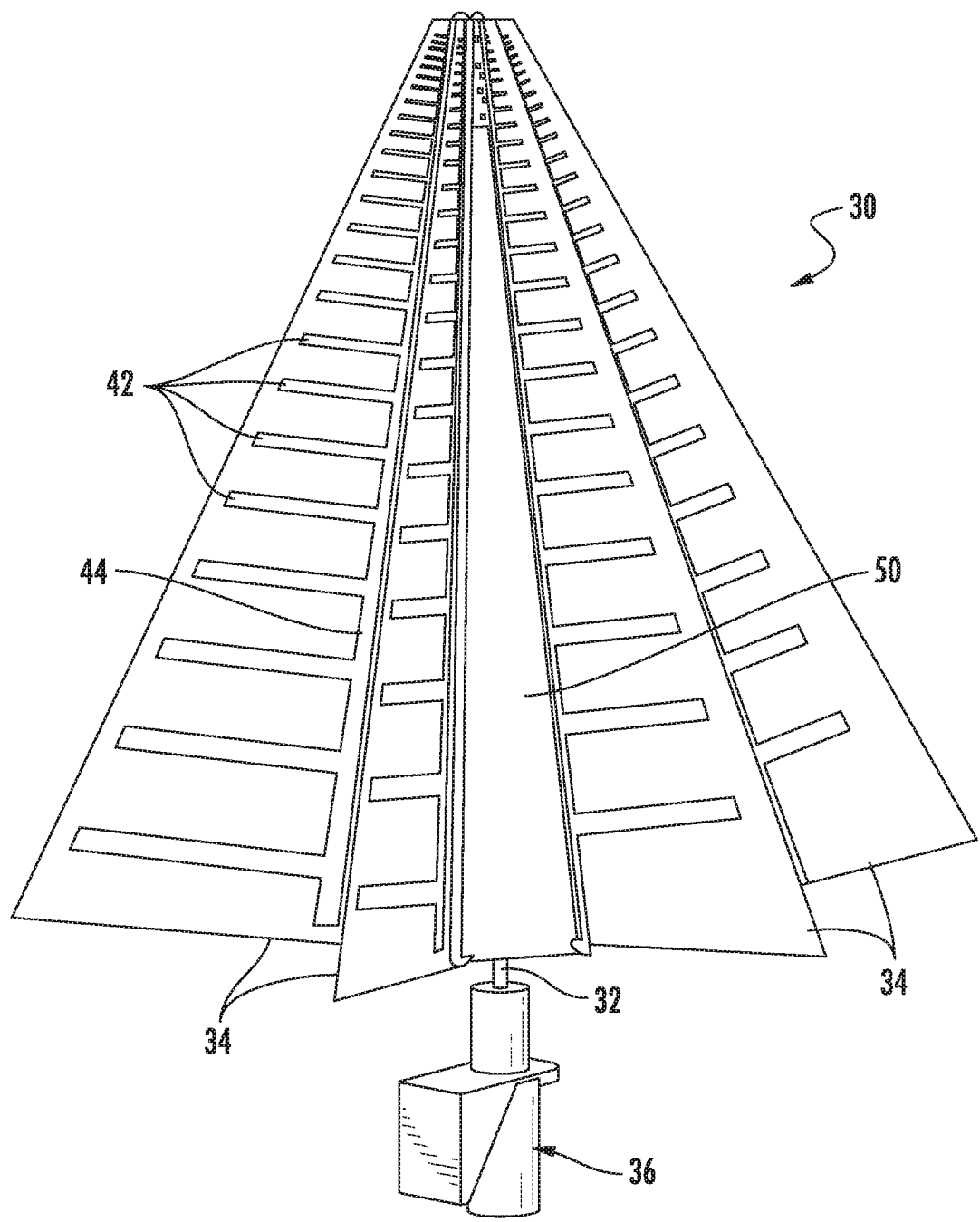
FIG. 1B is an enlarged perspective view of the outer space deployable antenna of FIG. 1A.
Figure 3:
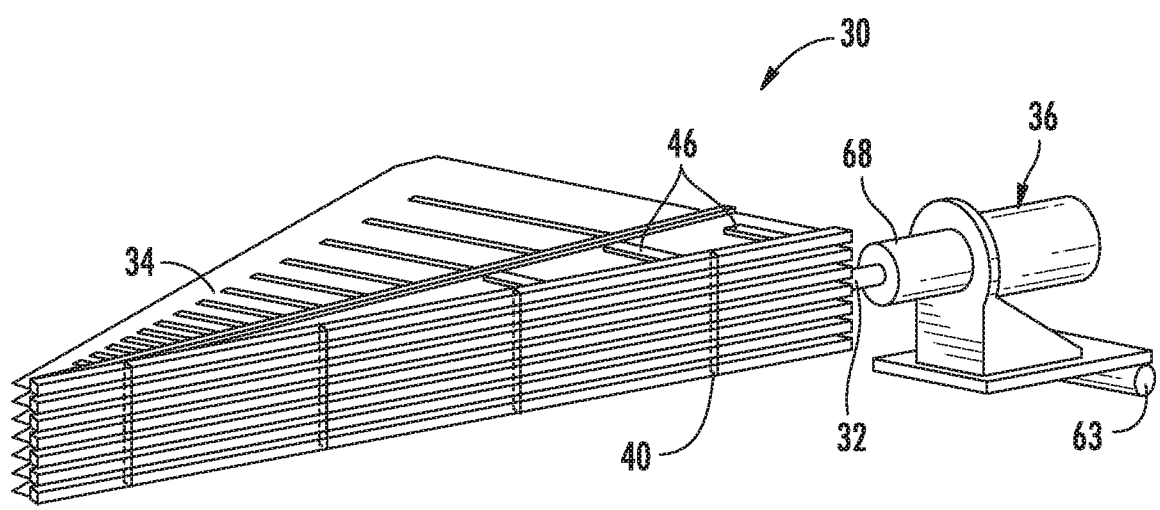
FIG. 3 is a fragmentary, perspective view of the antenna of FIG. 1A in its flat stored configuration.

An outer space deployable antenna is indicated generally at 30 and carried by the satellite housing 22 and coupled to the satellite transceiver 24. Basic components of the antenna 30 are shown in better detail in FIG. 1B. The antenna 30 includes a support shaft 32 and plurality of antenna fins 34, and in this example, six antenna fins, and an actuator 36. As explained in greater detail relative to FIGS. 5-8 and shown in the fragmentary, perspective view of FIG. 3, at least one draw cord 40 is coupled between the plurality of antenna fins 34 and the actuator 36 so that the plurality of antenna fins are movable from a flat stored configuration, such as shown in FIG. 3, to the fanned-out deployed configuration surrounding the support shaft 32 as shown in FIGS. 1A and 1B. Although the antenna 30 may be configured and sized to operate at different radio frequencies and wavelengths depending on end-use application, in this example, the antenna is formed as a log periodic parasitic monopole antenna, and operative in a wideband frequency of about 10:1 bandwidth and operative at about UHF frequencies as low as 200 MHz up to and above frequencies as high as 20 GHz. The six antenna fins 34 in this example operating as antenna arms may provide multi-polarization for transmit and receive functions via the satellite transceiver 24 carried by the satellite housing 22.

Each antenna fin 34 cooperates with the other antenna fins and each may include antenna elements 42 (FIG. 1A) connected in parallel to an antenna feed element 44, usually with an alternating phase, and in an example may simulate a series of multiple element YAGI antennas connected together, each tuned to a different frequency. The different antenna elements 42 for each antenna fin 34 operate together and may increase the frequency response or bandwidth. Each antenna fin 34 may include a support structure 46 (FIG. 3), such as formed from thin diameter and lightweight plastic or metal tubes or other support members that can add support and rigidity to each antenna fin. In FIG. 3, a portion of the first antenna fin 34 is partially exposed to show a support structure 46 that may be incorporated into each antenna fin 34. As explained in greater detail below, it is possible to incorporate a rigid dielectric layer into each antenna fin 34 such that a support structure 46 is not necessary.

The plurality of antenna fins 34 are positioned in spaced relation about the support shaft 22 when the plurality of antenna fins are moved from the flat stored configuration shown in FIG. 3, into the fanned-out deployed configuration surrounding the support shaft (FIG. 1B). In this fanned-out deployed configuration of the antenna 30, each antenna fin 34 is spaced equidistantly from each other at the same angle. In this example, the six antenna fins 34 are spaced 60° apart from an adjacent antenna fin surrounding the support shaft 32. Each antenna fin 34 in this example has a tapered shape, such that the antenna 30 is formed overall in a conical shape similar to a "Christmas tree" configuration.

Figure 2:
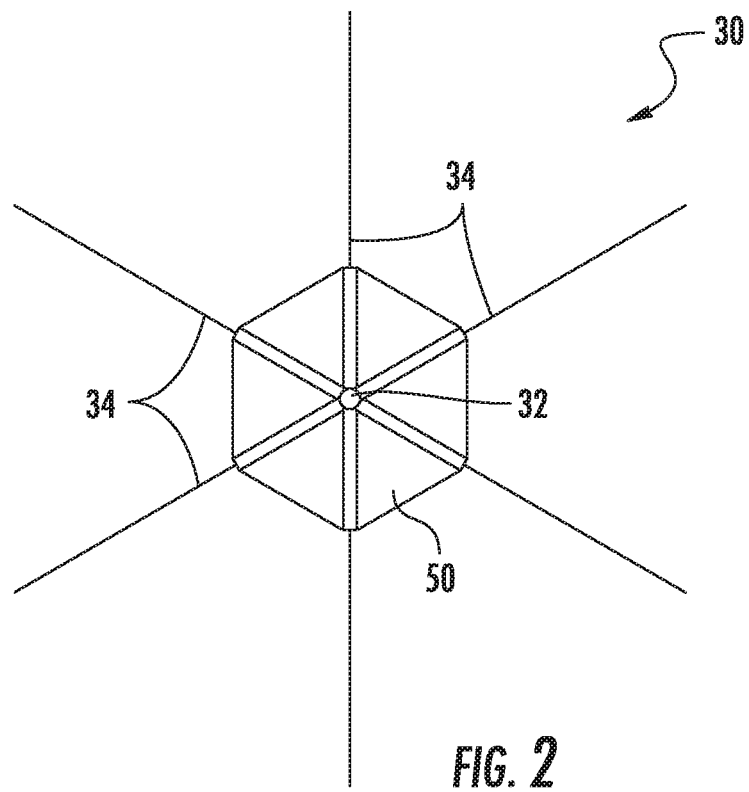
FIG. 2 is a top view of the antenna of FIG. 1A.

As best shown with reference to the top plan view of the antenna 30 in FIG. 2, an electrically conductive layer 50 is positioned between adjacent antenna fins 34 for the antenna function, and operates as a ground plane and is shown stretched between the antenna fins. In an example, this electrical conductive layer 50 may be formed as a thin web film or mesh material, and in an example, is a gossamer material formed of very thin mesh and operates as the ground plane. In an example, the electrical conductive layer 50 may be formed from a polymer material of 1 or 2 mil thickness or other thin film laminate material. In another example, the electrical conductive layer may be formed from Mylar that is folded up when the antenna 30 is in the flat stored configuration as in FIG. 3, and then stretched out when the antenna is moved into its fanned-out deployed configuration surrounding the support shaft 32. Mylar as metallized BoPET (Biaxially-Oriented Polyethylene Terephthalate) has been found advantageous to use since it has high tensile strength, chemical and dimensional stability, good barrier resistance and insulator properties, and excellent reflectivity. In an example, one electrical signal feed coaxial cable may attach to one end or the other of each antenna fin 34, which is used to connect this antenna 30 to other electronics for transmit or receive operation.

Figure 5:
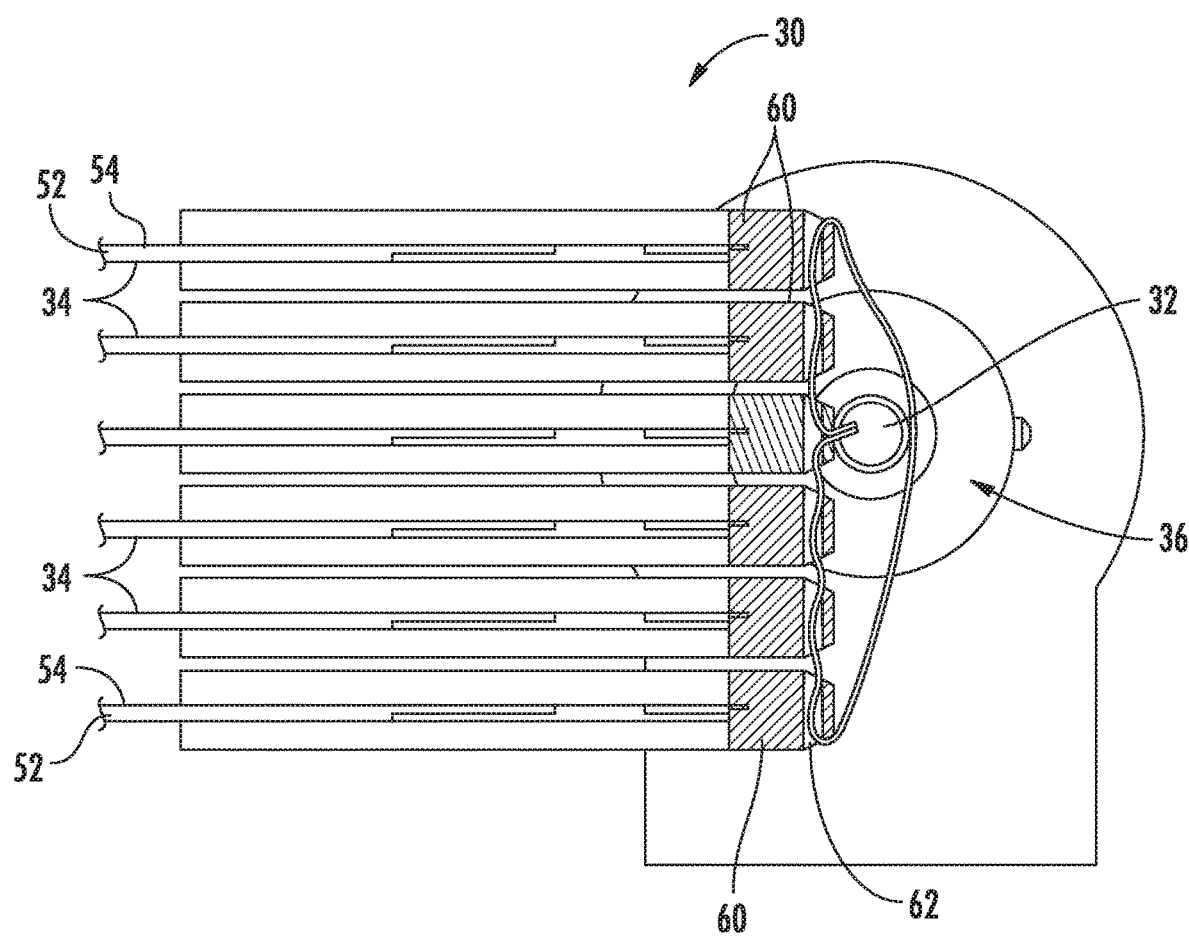
FIG. 5 is a partial sectional view of the antenna in its stored configuration showing the draw cord coupled between antenna fins.
Figure 8:
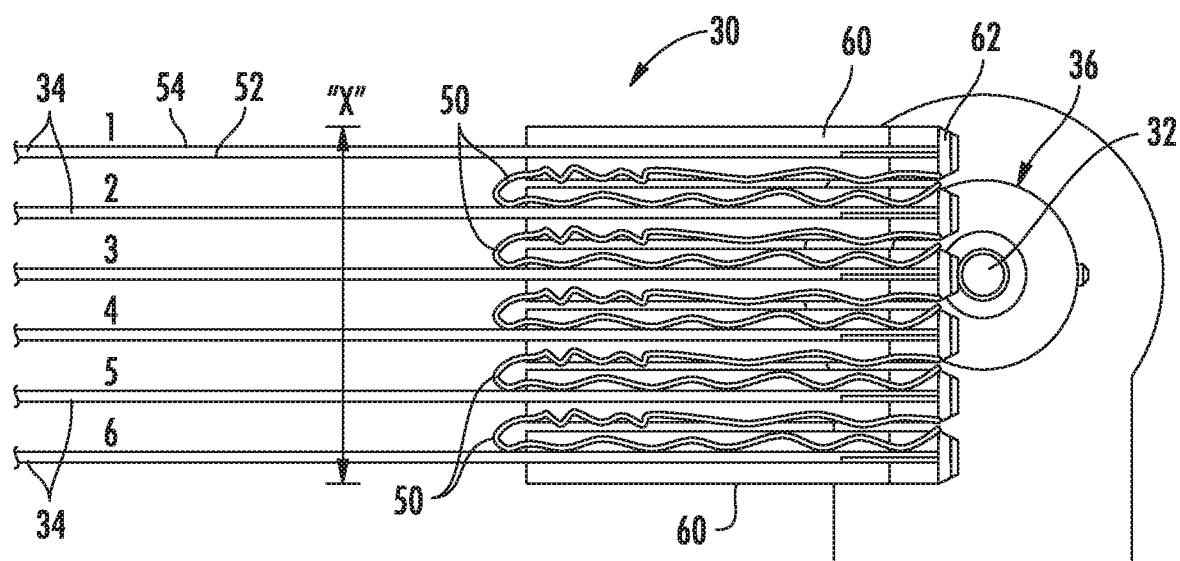
FIG. 8 is another fragmentary sectional view of the antenna similar to that shown in FIG. 5 and showing the electrical conductive layer folded between adjacent antenna fins.

Each antenna fin 34 may include a rigid dielectric layer as a substrate 52 and a conductive layer 54 thereon (FIGS. 5 and 8). It is possible for the conductive layer 54 to operate as an active antenna element and include another layer opposite the conductive layer to operate as a parasitic element. The antenna fin 34 could include a Mylar layer or other thin material layer that may be supported by the support structure 46 if it is used. It is possible for the rigid dielectric layer 52 to provide support as a substrate without use of a separate support structure 46 when it is made rigid and thick to act as a support.

Figure 7:
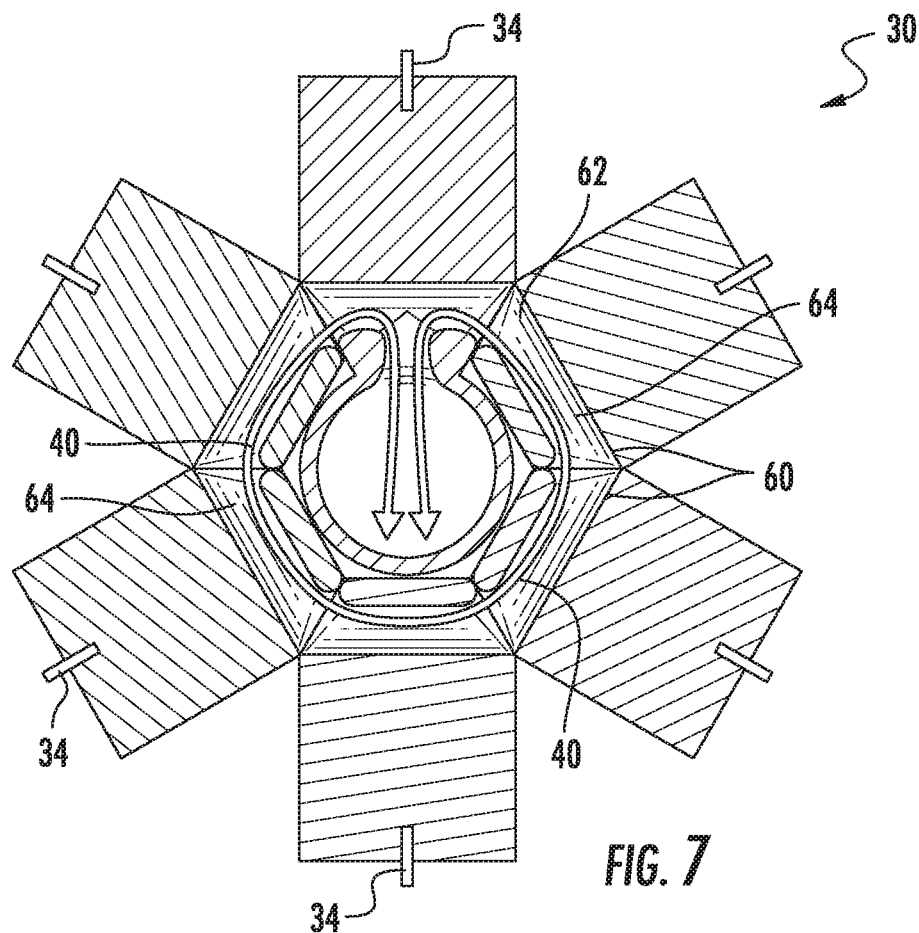
FIG. 7 is a partial sectional view of the antenna in its deployed condition showing antenna fins and fin supports in spaced relation about the support shaft.

In an example best shown in FIG. 7, a respective fin support 60 is coupled to a radially inner edge of each antenna fin 34 to maintain the plurality of antenna fins, in this example, the six antenna fins, in spaced relation to each other. Each fin support 60 may include a beveled edge 62 at the end proximate to the support shaft 32 so that in the deployed condition, the beveled edges 62 meet and position each antenna fin 34 sixty degrees apart. One of the plurality of antenna fin supports 60 is fixed to the support shaft (FIGS. 5 and 7) to operate as a stable antenna fin when the actuator 36, formed as an electric motor in this example, pulls the one or more draw cords 40 and moves the antenna fins 34 into their fanned-out deployed condition. In the example of FIG. 8, the antenna fin 34 marked number 3 is fixed.

Figure 4A:
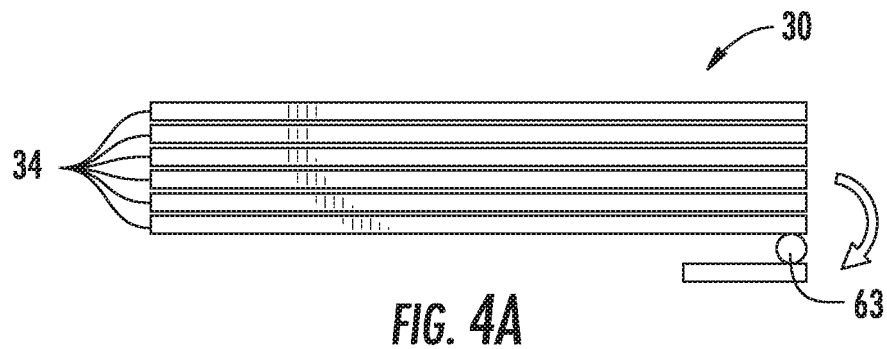
FIG. 4A is a schematic view of the antenna of FIG. 1A in its flat stored configuration.
Figure 4B:
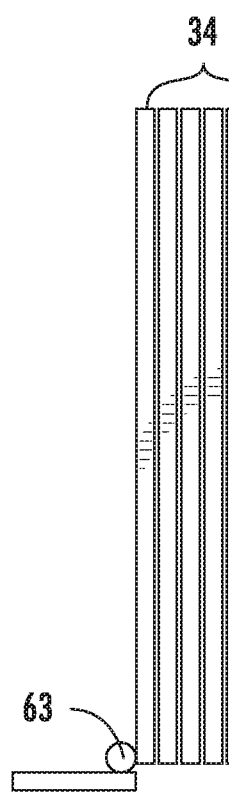
FIG. 4B is a schematic view of the antenna of FIG. 4A after being pivoted into a partially deployed position.
Figure 4C:
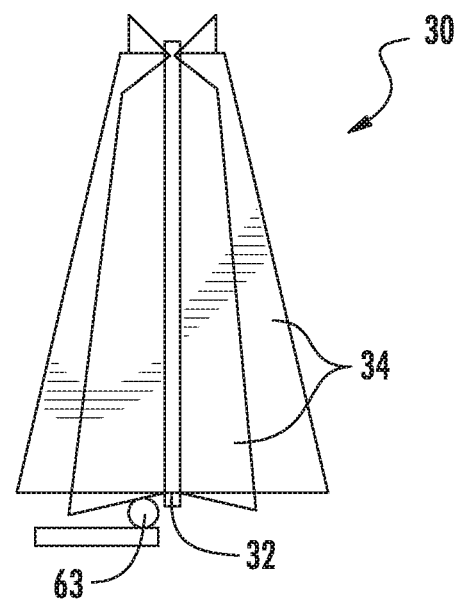
FIG. 4C is a schematic view of the antenna of FIG. 4B in its fanned-out deployed configuration.

Referring now to the schematic sequence diagrams of FIGS. 4A-4C, there is illustrated how the antenna 30 may be moved from its flat stored configuration in FIG. 4A to its fanned-out deployed configuration surrounding the support shaft 32 in FIG. 4C. For example, when the satellite 20 carrying the antenna 30 reaches Low Earth Orbit or other desired orbit where it will become operational, a support rod 63 connected to an antenna mounting plate (FIG. 3) may be pivoted 90° by a spring or drive mechanism, and thus, extend the flat and stored antenna fins 34 from their flat stored configuration shown schematically in FIG. 4A into their vertical position shown in FIG. 4B. At that time, the actuator 36 that is coupled to the at least one draw cord 40 will actuate and pull the draw cord so that the antenna fins 34 move from the stored configuration where they are stacked to each other to their fanned-out deployed configuration surrounding the support shaft 32 (FIGS. 1B and 4C). Although use of a draw cord 40 and associated actuator is one mechanism for moving the antenna fins 34 into their fanned-out deployed configuration, other mechanisms may be used such as spring actuated mechanisms or similar biasing mechanisms or a system of gears to deploy the fins similar to a draw cord.

Figure 6:
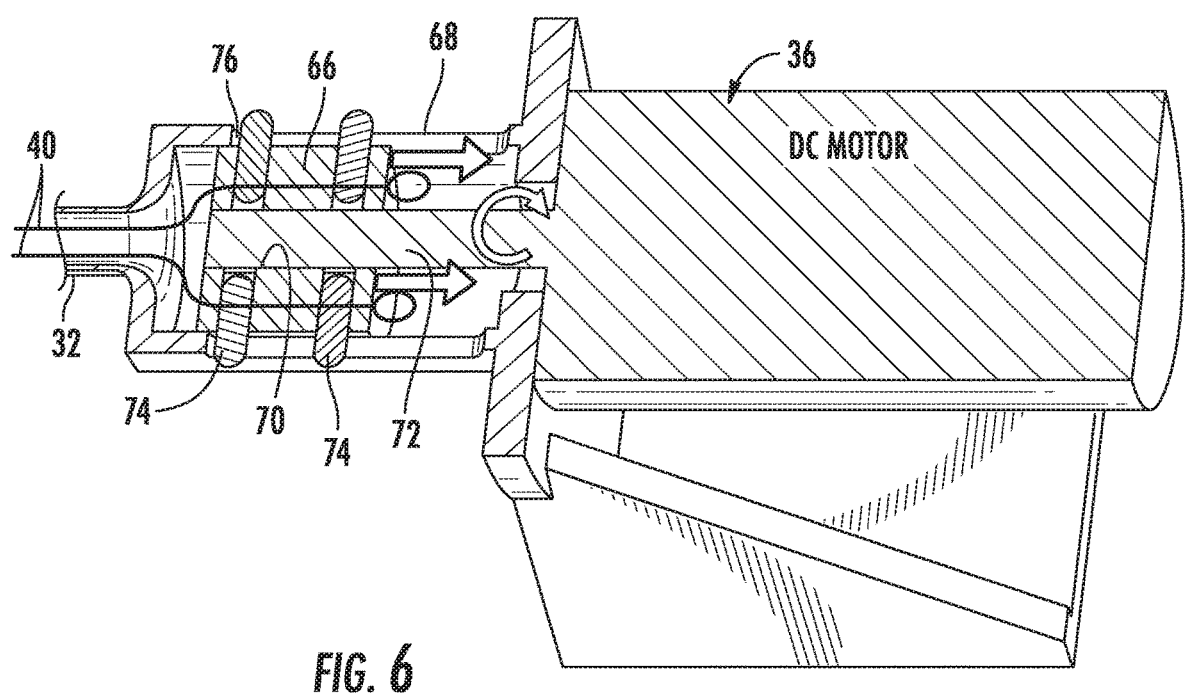
FIG. 6 is a fragmentary isometric view of the actuator and the draw cord coupled to a collar received within an actuator housing.

Referring now to FIGS. 5-7, there is illustrated an example of a mechanism using at least one draw cord 40 to move the antenna fins 34 into their fanned-out deployed configuration. At least one draw cord 40 is coupled between the plurality of antenna fins 34 and the actuator 36 to move the plurality of antenna fins from their flat stored configuration into a fanned-out deployed configuration surrounding the support shaft 32. In one example, the antenna fins 34 are coupled to the respective fin support 60 via the radially inner edge of each antenna fin and five of the antenna fins are stacked together in a free-floating manner, while one of the antenna fins, in this example, antenna fin number 3 in FIG. 8, is fixed to the support shaft 32 via its fin support. In an example, this fixed fin support 60 may be formed integral with the support shaft 32. Each antenna fin support 60 may be formed as an elongate lightweight metal or plastic rectangular configured support member that could be used as a rigid support for each antenna fin 34, thus making the separate support structure 46 unnecessary in some cases. In this example, the support shaft 32 is formed as a hollow rod, for example, formed from a rigid plastic or lightweight metal material. Each respective fin support 60 includes the beveled edge 62 such that when the actuator 36 pulls the draw cord 40, the five free-floating antenna fins 34 are moved around the support shaft 32 from the flat stowed position such that the beveled edges of adjacent support fins 60 are in contact with each other and each antenna fin 34 is spaced 60° apart as best shown in FIG. 7.

In an example best illustrated in FIGS. 5 and 7, the draw cord 40 may pass through each respective fin support 60 via a transverse hole 64 in each of the floating antenna fin supports 60 and routed down the hollow interior support shaft 32 and secured to a collar 66 contained in an actuator housing 68 as shown in FIG. 6 at the base of the support shaft 32. The collar 66 includes an internally threaded orifice 70 that receives a threaded output shaft 72 from the actuator 36, which is an electric motor in this example, and the collar is displaced axially upon electric motor actuation. As the actuator 36, e.g., the electric motor, slowly rotates its threaded output shaft 72, the internally threaded collar 66 is displaced axially and moved toward the actuator 36. The draw cord 40 is secured to this internally threaded collar 66, which may accommodate multiple draw cords, with individual draw cords extending through the five floating antenna assemblies and into the interior of the support shaft 32 back to the collar 66.

Internal pins 74 on the collar 66 are received in a slot 76 and used to constrain rotation of the collar 66 in the actuator housing 68, and as a result, motion of the collar is confined in the axial direction when the actuator 36 as the electric motor is actuated. The draw cord 40 in the example of FIGS. 5 and 7 passes through the transverse holes 64 in each respective fin support 60 and is illustrated with both ends of the draw cord 40 entering the support shaft 32 and will attach to the internally threaded collar 66 so that when the collar 66 is displaced toward the actuator 36 as the electric motor and its output shaft 72 rotates, the antenna fins 34 are moved from the flat stored configuration to their fanned-out deployed configuration surrounding the support shaft 32. It is possible to have one end of a draw cord 40 connected to that antenna fin 34 fixed to the support shaft 32 and the other end of the draw cord fixed to the internally threaded collar 66. The draw cord may pass through holes (not shown) in each antenna fin 34 so that when the collar 66 is moved axially toward the actuator 36 as the electric motor, the antenna fins are moved into their fanned-out deployed configuration surrounding the support shaft.

In the example shown in FIG. 8, the electrical conductive layer 50 between adjacent antenna fins 34 is formed as a gossamer or mesh grounding material and affixed to the respective fin supports 60 at their edge forming the bevel 62 and packs between the antenna fins 34 when the antenna 30 is in its flat stored configuration. When the antenna 30 is deployed, this electrical conductor layer 50 stretches to fill the triangular gap or pyramid face when the antenna is deployed in its fanned-out deployed configuration as best shown in FIGS. 1 and 2. It is possible that this electrical conductive layer 50 forming the ground plane between the first and sixth antenna fins as shown in FIG. 8 can be stretched via a spring-deployed gossamer material since tension is not provided between these two positions in this particular example.

In the example such as shown in FIG. 8, the antenna 30 is about 1.7 inches thick shown by the dimension "X" in the flat stored configuration and each antenna fin 34 may be about 8 inches long extending from its tip to the end of respective fin support 60 near the bevel 62. The antenna fins 34 are shown cut in FIG. 8 and shortened for purposes of illustration. These dimensions are only representative of a specific log periodic parasitic monopole antenna operative as a deployable broadband antenna and operating in a range from the low UHF up to about 20 GHz and above. The respective size of the antenna fins 34 and other components can vary depending on specific frequency and bandwidth ranges desired for operation of the antenna.

The antenna 30 as described provides a competitive advantage in the small satellite market, such as satellites manufactured from one or more CubeSat block units. This antenna 30 provides wideband communications and may be less expensive to launch. It may be stowed in a small satellite package. This antenna 30 may be used for remote sensing such as for Hawkeye 360 implementations and wireless applications in voice, machine-to-machine and special communications. By exploring a specific design as a log periodic parasitic monopole antenna, the antenna 30 may be used with an offset perimeter truss antenna for a wide range of applications from 200 MHz to 20 GHz. One reason for this advantage is its larger surface area and it can be used at higher frequencies.

It is also possible to use wire frame assemblies and inflatable membranes to move components or pivot the flat stored antenna vertically from its position shown in FIG. 4A to its vertical position in FIG. 4B.

Figure 9:
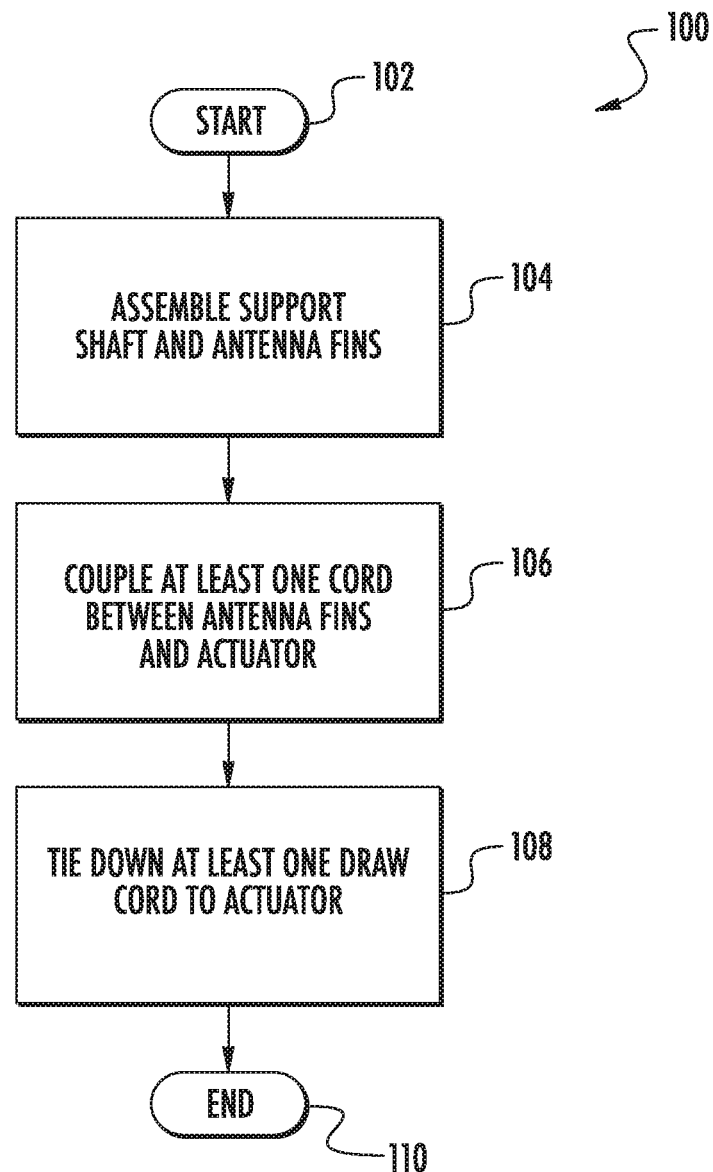
FIG. 9 is a high-level flowchart of a method for making the antenna.

Different manufacturing techniques may be used and in an example shown in the high-level flowchart of FIG. 9, a method for making the outer space deployable antenna 30 is illustrated generally at 100. The process starts (Block 102) and a support shaft 32 and plurality of antenna fins 34 are assembled together (Block 104) adjacent the support shaft. The at least one draw cord 40 is coupled between the plurality of antenna fins 34 and actuator 36 (Block 106). The draw cord 40 is then tied down to the respective endpoints, which could be both ends tied and connected to the collar 66 that displaces axially upon electric motor activation (Block 108). The process ends at Block 110.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An outer space deployable antenna comprising:
a support shaft;
a plurality of antenna fins;
an actuator; and
at least one draw cord coupled between the plurality of antenna fins and the actuator so that the plurality of antenna fins is moveable from a flat stored configuration along one side of the support shaft, and pulled around the support shaft by the at least one draw cord to a fanned-out deployed configuration surrounding the support shaft.

2. The outer space deployable antenna of claim 1 wherein the plurality of antenna fins is in spaced relation about the support shaft in the fanned-out deployed configuration.

3. The outer space deployable antenna of claim 2 comprising a respective fin support coupled to a radially inner edge of each antenna fin to maintain the plurality of antenna fins in spaced relation.

4. The outer space deployable antenna of claim 2 comprising an electrical conductive layer between adjacent antenna fins.

5. The outer space deployable antenna of claim 1 wherein one of the plurality of antenna fins is fixed to the support shaft.

6. The outer space deployable antenna of claim 1 wherein the support shaft has a passageway therethrough; and wherein the draw cord extends through the passageway.

7. The outer space deployable antenna of claim 1 wherein the actuator comprises an electric motor.

8. The outer space deployable antenna of claim 1 wherein each antenna fin comprises a rigid dielectric layer and a conductive layer thereon.

9. The outer space deployable antenna of claim 1 wherein each antenna fin has a tapered shape.

10. A satellite comprising:
a satellite housing;
a satellite transceiver carried by the satellite housing; and
an outer space deployable antenna carried by the satellite housing and coupled to the satellite transceiver, the outer space deployable antenna comprising
a support shaft,
a plurality of antenna fins,
an actuator, and
at least one draw cord coupled between the plurality of antenna fins and the actuator so that the plurality of antenna fins is moveable from a flat stored configuration along one side of the support shaft, and pulled around the support shaft by the at least one draw cord to a fanned-out deployed configuration surrounding the support shaft.

11. The satellite of claim 10 wherein the plurality of antenna fins is in spaced relation about the support shaft in the fanned-out deployed configuration.

12. The satellite of claim 11 comprising a respective fin support coupled to a radially inner edge of each antenna fin to maintain the plurality of antenna fins in spaced relation.

13. The satellite of claim 11 comprising an electrical conductive layer between adjacent antenna fins.

14. The satellite of claim 10 wherein one of the plurality of antenna fins is fixed to the support shaft.

15. The satellite of claim 10 wherein the support shaft has a passageway therethrough; and wherein the draw cord extends through the passageway.

16. The satellite of claim 10 wherein the actuator comprises an electric motor.

17. The satellite of claim 10 wherein each fin comprises a rigid dielectric layer and a conductive layer thereon.

18. The satellite of claim 10 wherein each fin has a tapered shape.

19. A method for making an outer space deployable antenna comprising:
assembling a support shaft and a plurality of antenna fins adjacent the support shaft; and
coupling at least one draw cord between the plurality of antenna fins and an actuator so that the plurality of antenna fins is moveable from a flat stored configuration along one side of the support shaft, and pulled around the support shaft by the at least one draw cord to a fanned-out deployed configuration surrounding the support shaft.

20. The method of claim 19 wherein the plurality of antenna fins is in spaced relation about the support shaft in the fanned-out deployed configuration.

21. The method of claim 19 wherein one of the plurality of antenna fins is fixed to the support shaft.

22. The method of claim 19 wherein the support shaft has a passageway therethrough; and wherein the draw cord extends through the passageway.

23. The method of claim 19 wherein the actuator comprises an electric motor.

24. The method of claim 19 wherein each fin comprises a rigid dielectric layer and a conductive layer thereon.

25. The method of claim 19 wherein each fin has a tapered shape.

* * * * *